United States Patent Office 3,225,281
Patented Dec. 21, 1965

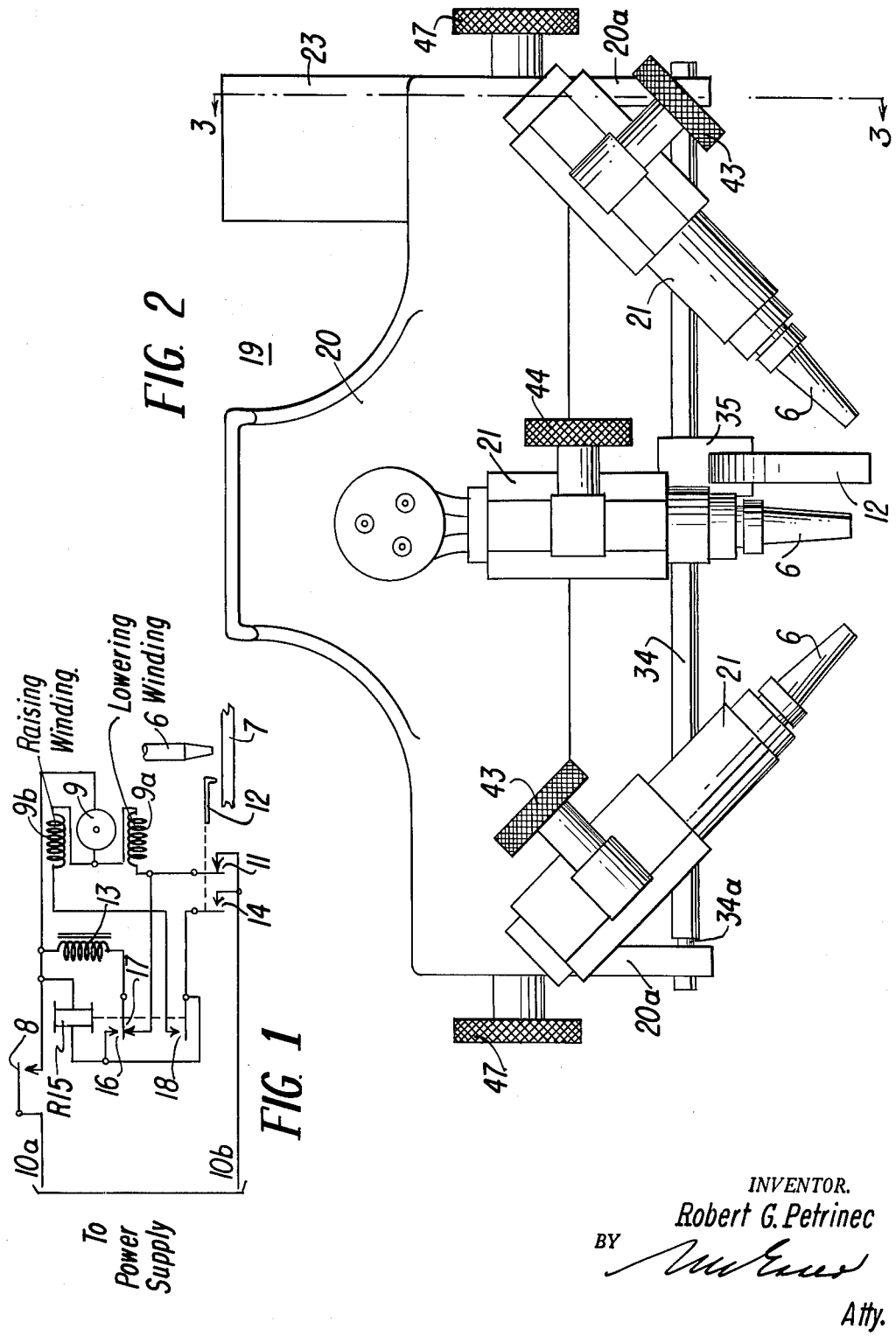

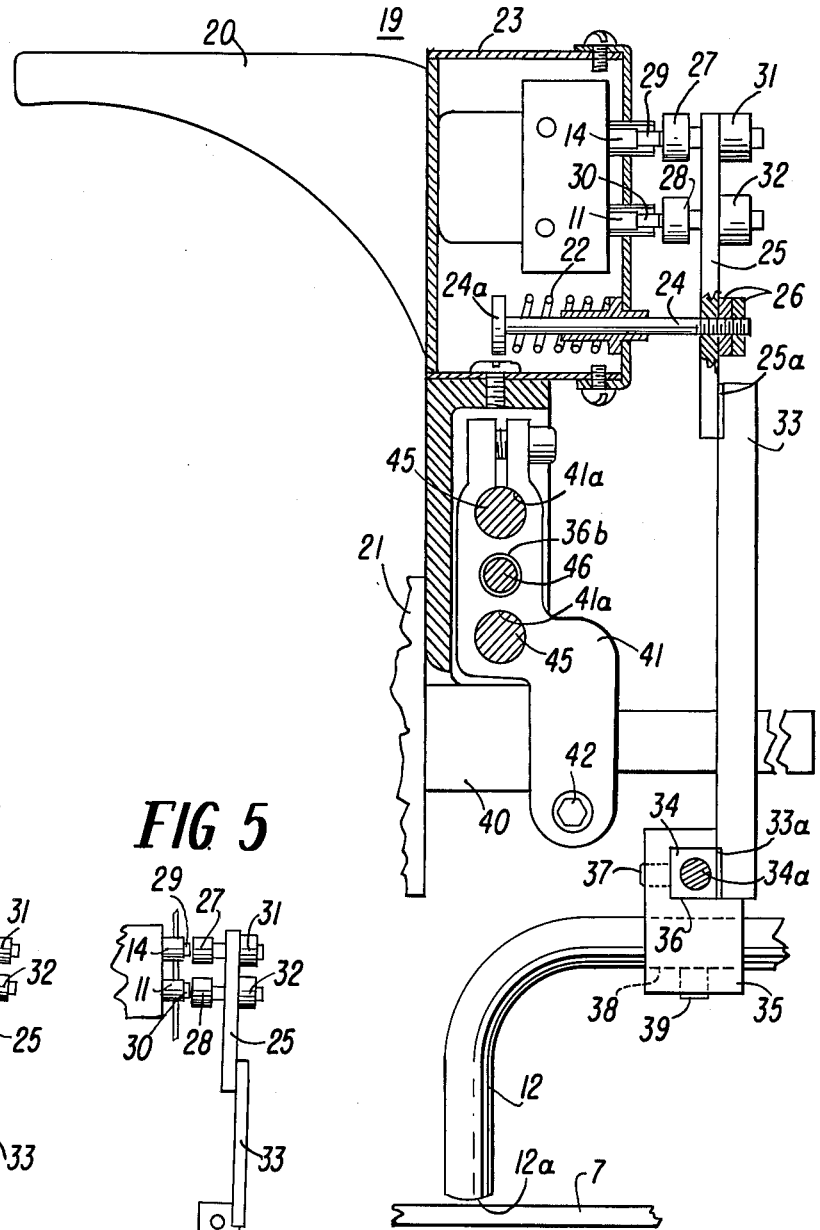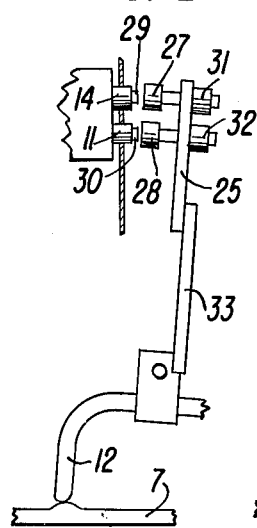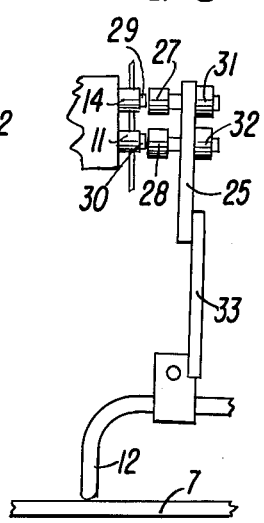

3,225,281
AUTOMATIC POSITIONING APPARATUS FOR CUTTING TORCHES
Robert G. Petrinec, Chicago, Ill., assignor to Chemetron Corporation, Chicago, Ill., a corporation of Delaware
Filed Jan. 31, 1961, Ser. No. 86,174
2 Claims. (Cl. 318—261)

This invention relates to a torch device of the type in which a gas produced flame is directed from a torch tip towards a metal workpiece for flame cutting, welding, flame hardening or the like.

In automatic torch cutting and welding operations where the torch tips are directed toward a work surface and maintained at a preset distance from the work, irregularities in the work surface such as indentations, warped portions and rippled areas ultimately affect the quality of the weld, cut or the like. Various devices are utilized to compensate for these irregularities, such as "feeler arms" which travel on the work surface ahead of the torch adapted to raise or lower the torch as these irregularities are engaged to maintain the preset distance between the torch and the work surface. However, in the latter example the engagement of a rippled surface by the feeler arm causes the torch to vibrate by the raising and lowering together with the weight of the overlying equipment which makes for an irregular and uneven cut or weld, whichever the case may be. Other devices which are being utilized compensate for the irregularities by utilizing the electrical conductivity of the flame whereby as the distances from the tip to the work surface are changed by the irregularities, current conditions in an associated circuit are also changed. However, this has proved unsatisfactory where the work surface is wet or is painted, as these surface coatings affect and alter the conductivity of the flame, and consequently the cut or weld.

It is therefore an object of this invention to provide a torch device of the character described, having novel automatic positioning means by which the torch tip can be maintained or controlled at a preset distance from the work surface during operations irrespective of the irregularities or coatings on said work surface.

Another object is to provide a torch device of the type described having new and improved means for accurately distancing the torch tip from the work surface within preset limits.

It is another object to provide means in the form of limit switches and a brake in which the limit switches operate responsive to sensing means to energize a reversible motor for lowering or raising the torch or torches only at such times as irregularities in the work surface exceeds preset limits or tolerances, and the brake also responds to the operation of the limit switches to release the reversible motor during the torch lowering or raising operations and positively stop the reversible motor immediately when a limit switch operates indicating the desired preset limit of the torch or torches relative to the work surface.

Other objects and advantages of this invention will become more readily apparent as the following description proceeds taken in conjunction with the accompanying drawings, in which;

FIG. 1 is a schematic diagram of a system embodying the invention;

FIG. 2 is a front view of an apparatus embodying the invention;

FIG. 3 is a sectional view taken along line 3—3 of FIG. 2 but omitting the torch assemblies and showing a sensing arm in a normal raised position above the work surface;

FIG. 4 is a sectional view showing the sensing arm engaging an inclination in the work surface; and FIG. 5 is a sectional view showing the sensing arm in normal engagement with a smooth work surface.

Referring to the simplified electrical circuit shown in FIG. 1, a gas heating or cutting torch 6 is shown above a work piece 7 to be cut, welded, or heated by the flame of the torch. Ordinarily more than one torch, but set at different angles relative to the work surface are as seen in FIG. 2, directed on a point of a pattern to be worked upon. To automatically place the torch or torches at a preset distance from the work surface of the work piece 7, the switch 8 is manually closed to complete a circuit to an A.C. or D.C. reversible motor 9. This last circuit extends from a suitable power supply over the conductor 10a contacts of the switch 8, the lower winding 9a of the motor 9, contacts of a limit switch 11 and back over conductor 10b to the power supply. The winding 9a is thus energized to cause the motor 9 to lower a sensing member or arm 12 (FIG. 3) and the torch 6. The sensing arm 12 which is disposed below the torch 6 at a preset distance, will lower with the torch 6 and the limit switch 11 will be actuated when a predetermined pressure is applied by the work surface against the sensing arm 12. The actuation of the limit switch 11 will thus open the circuit to the reversible motor 9. The closure of the manual switch 8 also closes a circuit to a solenoid 13 of a brake (not shown) of any well-known design via closed contacts 17 of a relay R15 and the closed contacts of limit switch 11. The solenoid 13 upon being energized releases the brake which normally holds the rotor of the motor 9 in a steadfast position, thus permitting downward movement of the torch. When the limit switch 11 is actuated and its contacts opened, the solenoid 13 is deenergized to apply the brake to motor 9 and immediately check or stop the rotor from further rotation, consequently stopping the downward movement of torch 6.

The sensing arm 12 follows a pattern on the work surface to be cut leading the path for the torch 6 which follows closely behind or alongside the arm 12 during movement by a single or multiple torch arrangement in a well-known manner. Thus, assuming the sensing arm 12 engages an indentation in the work surface, the arm 12 will lower into the indentation releasing the tension applied to the arm 12 by the work surface, causing the limit switch 11 to be actuated to reclose its contacts. This closure of the contacts of limit switch 11 will again cause the winding 9a of the reversible motor 9 to be energized to cause the torch 6 and arm 12 to lower until the sensing arm 12 is tensioned sufficiently by the work surface to a gain open the contacts of limit switch 11.

Should the sensing arm 12 engage an inclined area during its travel, an excessive amount of tension would be applied by the work surface against the sensing arm 12 causing the limit switch 14 to be actuated to close its contacts, consequently closing a circuit to relay R15. This last circuit extends from the power supply, conductor 10a, contacts 8, the winding of relay R15, closed contacts of limit switch 14, and back to the power supply via conductor 10b. Relay R15 upon being energized closes contacts 16 and 18 completing circuits respectively to the brake solenoid 13 and the upper winding 9b of the reversible motor 9. The energization of solenoid 13 will again release the brake from motor 9 and the energization of winding 9b will cause the reversible motor 9 to raise the torch 6 and arm 12, until the excessive tension is removed from arm 12 to cause the contacts of limit switch 14 to re-open. The re-opening of the contacts of limit switch 14 will deenergize relay R15, solenoid 13 and winding 9b of motor 9. The opening of these respective circuits causes the brake to immediately check the motor 9 to consequently hold the torch 6 in the newly raised position. Therefore, the raising and lowering of the torch is accomplished in a smooth manner by opening and closing the circuit to a reversible motor and immediately applying a brake to the motor when the torch reaches a desired preset distance from the work surface.

Referring to FIGS. 2 and 3, the cutting or welding device may comprise a multiple beveler, designated in its entirety as 19, having a mounting frame 20 on which various components of the invention are mounted. The mounting frame 20 is adapted for movement along on tracks (not shown) in a manner well-known in the art. Mounted on the mounting frame 20 are torch holders 21 adapted to hold the various torches 6 to be used, and associated manual torch adjusting means. When properly adjusted for operation a spring 22 has sufficient tension to control a pair of limit switches 11 and 14 mounted side by side on a plate 23 secured to the mounting frame 20. The spring 22 circumscribes a portion of a rod 24 which protrudes through an opening in the plate 23. The rod 24 has a shoulder 24a which holds one end of the spring 22, and the other end of the spring abuts the inner surface of the plate 23. One end of the rod 24 is threaded, and extends through an opening in a sensing arm plate 25 where nuts 26 tension the sensing plate 25 toward the plate 23. Thus by means of the nuts 26 the preferred tension can be applied to the sensing rod plate 25 and consequently determines the distance that armature actuating thumbs 27 and 28 are spaced from the contact armatures 29 and 30 of the limit switches. The limit switch actuating arms 29 and 30 may take the form of bolts having threaded portions extending through openings in the sensing arm plate 25, where nuts 31 and 32 secure the bolts to the rod 24. The nuts 31 and 32 also serve to adjust the spacing of the thumbs 27 and 28 from their respective contact armatures 29 and 30. The sensing arm plate 25 is welded as at 25a to one end of an elongated sensing arm rod 33, and the other end of the rod 33 is welded as at 33a to a bar 34 rectangular in section, the axis of which lies perpendicular to the axis of the rod 33. The rectangular bar 34 has at its opposite ends circular portions 34a adapted for insertion into holes in extending arms 20a (FIG. 2) of the mounting frame 20 for permitting pivotal movement of the rectangular bar 34.

A sensing arm holder 35 in the form of a substantially rectangular block has by means of an opening 36 for sliding the holder 35 horizontally along the rectangular bar 34, and a set screw 37 inserted into a threaded hole in the holder 35 is adapted to be tightened against the bar 34 in a preselected position of the holder. The sensing arm holder 35 holds the sensing arm 12 in a preselected position by means of an opening 38 through which the arm 12 slides, and is tightened in this position by means of a set screw 39 inserted in a threaded bore in the holder 35. The sensing arm 12 which is substantially L-shaped, thus has its sensing end 12a adapted for engagement with a work surface of workpiece 7 for pivoting the rectangular bar 34 as irregularities in the work surface are engaged.

There are three torches shown, namely the two oppositely angularly disposed torches and a substantially vertically disposed torch 6 interposed between the two angularly adjusted torches. The center torch 6 is adjustable for angular movement only on the mounting plate 20, but is moved laterally with the mounting frame 20 of the multiple beveler, whereas the angularly disposed torches 6 are adjustable for both angle and lateral spacing on the mounting plate 20. Each angularly disposed torch 6 is held in position by means of a bar 40 (FIG. 3) adjustably spaced away from the main frame by means of a pair of torch mounting brackets 41 having an opening through which the bar 40 extends and is fastened by means of a bolt 42. By means of the bolt 42 and the opening in the mounting bracket 41, each torch 6 can be rotated and secured at a preselected angle relative to the work surface. By means of the knob 43 which controls a gearing arrangement of any conventional type, the torches can be adjusted longitudinally with respect to the work surface for a preselected spacing. Likewise, the knob 44 controls the longitudinal spacing of the center torch 6 to the work surface, and also has a rod and mounting bracket (not shown) for controlling the angle of the torch relative to the work surface.

The torch mounting brackets 41 are supported in their respective vertical positions by means of a pair of rods 45 which fit through bores 41a and are fastened at opposite ends to extensions on the mounting frame 20. A threaded rod 46, one for each mounting bracket of the angularly disposed torches 6 extend through threaded bores 41b in the mounting bracket 41 and a bore in the extension of the mounting frame 20, where it terminates at one end in a knob 47 to control lateral movement of the angular torches 6.

Thus, when a cutting operation is to take place, the entire multiple beveler is first lowered onto the work surface. In the raised position illustrated in FIG. 3, both of the contact actuating thumbs 27 and 28 are engaging and applying pressure against the limit switch actuating armatures 29 and 30. In this normal raised and inoperative position, the applied pressure to armatures 29 and 30 maintains the contacts of limit switch 14 in an open position and the contacts of limit switch 11 in a closed position as shown in FIG. 1. The manual switch 8, FIG. 1, is closed as previously described to close the circuit to the lowering winding of the reversible motor 9 via the closed contacts of limit switch 11. As pressure is continuously applied by the work surface 7 against the sensing arm 12 being lowered thereon, the sensing arm rod 33 will rotate away from the limit switches until thumb 28 disengages armature 30 to open the contacts of limit switch 11 and consequently stop further lowering of the sensing arm as illustrated in FIG. 5. At this point, the torch or torches to be utilized are adjusted at preset distances from the work surface and in alignment to follow directly behind or alongside the sensing arm 12 as illustrated in FIG. 2 during the cutting or welding operation.

The multiple beveler is now put into operation causing sensing arm 12 to follow a pattern to be cut by the chosen torches following closely behind or along side the sensing arm 12. Assuming that the sensing arm 12 engages irregularities in the work surface, such as inclinations or depressions, the limit switches will be actuated accordingly to automatically raise or lower the chosen torch or torches. For instance, should the sensing arm 12 engage a depression in the work surface, the rectangular bar 34 will pivot and assume the same position as illustrated in FIG. 3, causing the thumb 27 to reactuate limit switch 11 by depressing armature 29. Consequently, the previously described reversible motor circuit will be closed to cause the entire multiple beveler 19 to be driven downward until the null position is again reached to open the circuit. When the sensing arm 12 engages an inclined irregularity in the work surface, as illustrated in FIG. 4, the rod 33 will pivot causing both thumbs 27 and 28 to disengage their respective contact actuating armatures 29 and 30 to consequently close the circuit to the reversible motor 9 for raising the torch until again the null position is reached. In this latter position, the contacts of limit switch 14 are closed and the contacts of limit switch 11 are open.

There is thus provided means for adjusting the tension of spring 22 and consequently the tension against the arm rod 33 together with the adjustment of the length by which the sensing arm 12 can be extended within opening 38 of the holder 35. The sensing arm can thus be so adjusted that tiny ripples in the work surface will not cause the sensing arm to actuate the limit switches. The sensing arm therefore can be adjusted within reasonable predetermined tolerances for irregularities on the work surface, whereby only irregularities on the work surface inconsistent within a pedetermined preset tolerance will cause the sensing arm to actuate one of the limit switches.

While one specific and preferred form of the automatic torch positioning apparatus incorporating the present invention has been illustrated and described, it will be understood that other forms will be suggested to those skilled in the art and that it is intended to include all such that do not depart from the spirit of this invention within its scope as best defined in the appended claims which claim:

1. Automatic positioning apparatus for a torch, comprising: a torch, torch moving means including a reversible electric motor, brake means for immediately stopping said motor and for enabling said motor to move said torch, said brake means including an electrically energizable solenoid, a sensing member movably mounted adjacent said torch for riding over and responding to inclinations in a work surface, and control means for actuating said motor and said solenoid, said control means including a first switch operable by said sensing member for causing energization of said solenoid to enable movement of said torch moving means and for causing energization of said motor to move said torch in one direction, an electrically energizable relay, a second switch operable by said sensing member for causing energization of said relay, and switch means operable by said relay for causing energization of said solenoid to enable movement of said torch moving means and for causing energization of said motor to move said torch in the opposite direction so that said torch can be prevented from moving outside predetermined distance limits relative to the work surface.

2. Automatic positioning apparatus for a torch, comprising: a torch, torch moving means for moving said torch in one direction and an opposite direction, said torch moving means having a reversible electric motor, brake means alternately operable for immediately stopping said torch moving means and for enabling movement of said torch, said brake means including an electrically energizable solenoid, a sensing member movably mounted adjacent said torch for riding over and responding to inclinations in the work surface, and control means for actuating said motor and said solenoid, said control means including a first switch operable in the closed position to cause simultaneous actuation of said motor in said one direction and energization of said solenoid to enable said torch to be lowered and including a second switch operable in the closed position to cause simultaneous actuation of said motor in said opposite direction and energization of said solenoid to enable said torch to be raised so that said torch can be prevented from moving outside predetermined distance limits relative to the work surface.

References Cited by the Examiner
UNITED STATES PATENTS

| | | | |
|---|---|---|---|
| 893,536 | 7/1908 | Newell | 318—372 X |
| 2,747,152 | 5/1956 | Greene | 266—23 |
| 2,755,423 | 7/1956 | Hazer | 318—266 |
| 2,769,127 | 10/1956 | Newman | 318—272 |
| 3,032,328 | 5/1962 | Petersen et al. | 266—23 |
| 3,049,656 | 8/1962 | Zollinger | 318—272 X |

FOREIGN PATENTS

| | | |
|---|---|---|
| 531,979 | 1/1941 | Great Britain. |
| 534,714 | 3/1941 | Great Britain. |

ORIS L. RADER, *Primary Examiner.*

MILTON O. HIRSHFIELD, *Examiner.*